United States Patent [19]

Chales

[11] Patent Number: 5,249,841
[45] Date of Patent: Oct. 5, 1993

[54] FRAMES FOR THE BACKS OF SEATS AND THE LIKE AND TO THEIR MANUFACTURE METHODS AND DEVICES

[75] Inventor: Bernard Chales, Flers, France

[73] Assignee: Bertrand Faure Automobile "BFA", Massy, France

[21] Appl. No.: 809,145

[22] Filed: Dec. 18, 1991

[30] Foreign Application Priority Data

Dec. 27, 1990 [FR] France ................. 90 16346

[51] Int. Cl.⁵ .................................. A47C 7/02
[52] U.S. Cl. ..................... 297/452.18; 297/463
[58] Field of Search ............ 297/452, 457, 463

[56] References Cited

U.S. PATENT DOCUMENTS

| | | | |
|---|---|---|---|
| 2,550,479 | 4/1951 | Hoven | 297/452 |
| 3,292,187 | 12/1966 | Bessler | 297/452 X |
| 3,323,151 | 6/1967 | Lerman | 297/452 X |
| 4,509,796 | 4/1985 | Takagi | 297/452 |
| 5,350,390 | 9/1982 | Ogawa | 297/452 |

*Primary Examiner*—Laurie K. Cranmer
*Attorney, Agent, or Firm*—Larson and Taylor

[57] ABSTRACT

A rigid frame for use as framework in the back of a car seat is constituted by a shell which is itself built up by assembling together two half-shells (3) of stamped sheet metal along their juxtaposed edge flanges, which flanges extend respectively around an inside perimeter and an outer perimeter of each of the half-shells. A major portion at least of the length of the juxtaposed flanges of the half-shells is rolled up to form tubes (6, 7) of closed circular section.

7 Claims, 3 Drawing Sheets

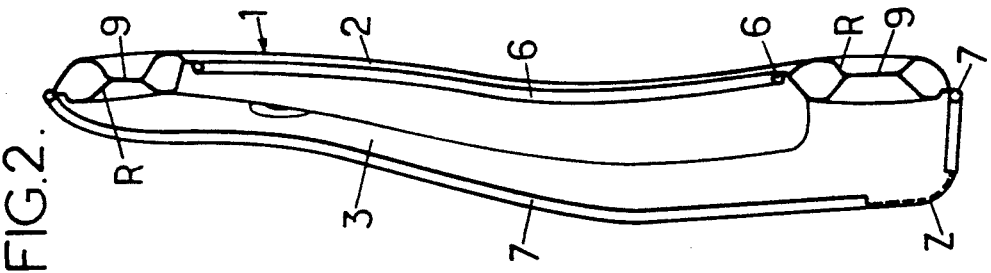
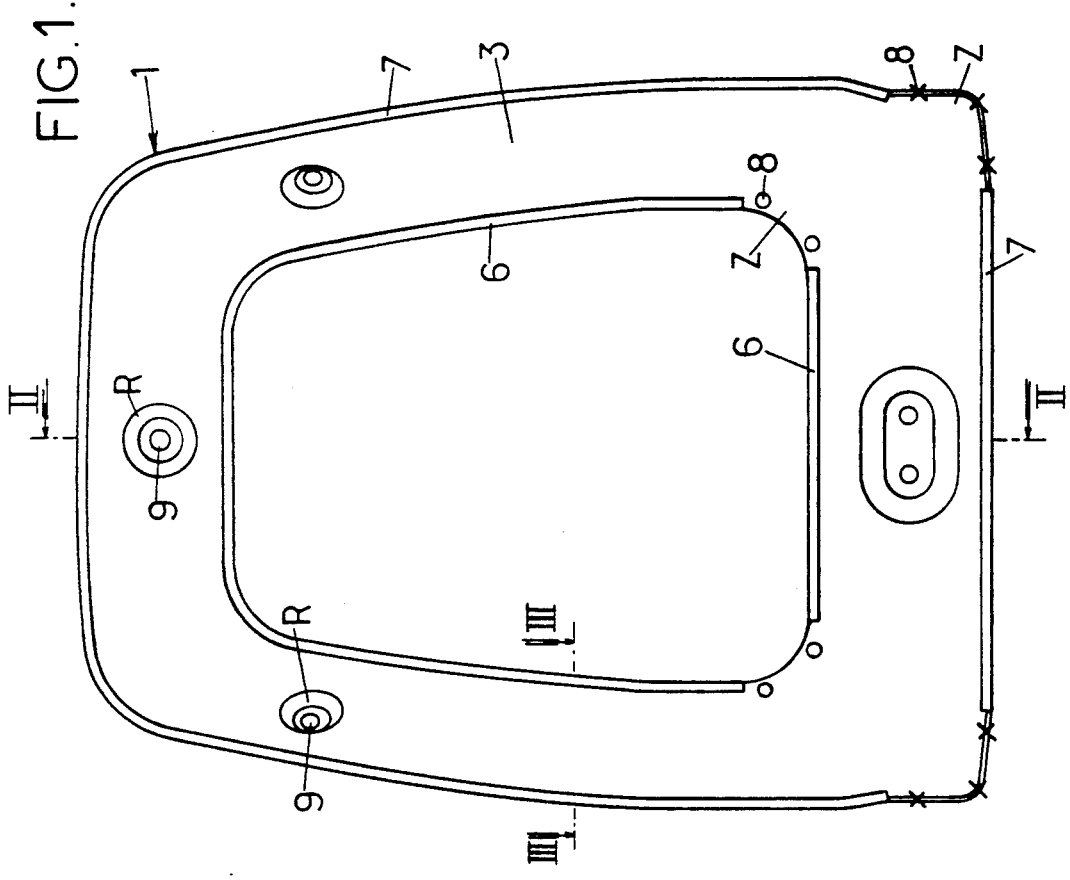

FRAMES FOR THE BACKS OF SEATS AND THE LIKE AND TO THEIR MANUFACTURE METHODS AND DEVICES

The invention relates to rigid frames serving as frameworks for car seat components, and essentially for the backs and the seats proper of such seats, and optionally for headrests and armrests therefor.

More particularly, the invention relates to frames constituted by shells that are themselves formed by assembling together two half-shells of stamped sheet metal along juxtaposed edges thereof which extend respectively along an outer perimeter and an inner perimeter of each half-shell.

Such frame-shaped shells are advantageous in that it is possible to ensure that they have optimum strength at all points thereon for a given mass of metal by having a shell whose local section is of appropriate shape and size.

In known embodiments of such frame shells under consideration, the juxtaposed edges of the two half-shells are in the form of substantially plane flanges folded towards the inside of the frame around the inside edge of the half-shell and towards the outside of the frame around the outside edge of the half-shell.

Presently available shells suffer from various drawbacks, and in particular the following:

the assembled-together flanges constitute dangerous projections that may behave like knife blades regardless of the direction in which they point, and this can give rise to injury during manufacture of the shells in question, during subsequent handling thereof, during padding thereof, and also after the corresponding seats are in service, particularly in the event of the padding being removed locally from the seats and/or by the occupants of vehicles fitted with such seats coming into collision;

expensive equipment is required for assembling the juxtaposed flanges together, regardless of whether assembly is done by stapling, by welding, or otherwise; and the reliability of the resulting assembly often leaves much to be desired.

A particular aim of the present invention is to remedy the above drawbacks.

To this end, according to the invention, frames of the kind in question are essentially characterized in that the juxtaposed flanges of the half-shells are rolled up into tubes of closed circular section, at least over the major portion of their length.

In advantageous embodiments, one or more of the following dispositions are also implemented:

at least one of the two pairs of juxtaposed flanges is constituted by a plurality of tubular lengths that are separated from one another by flat portions that are short in length;

the flat lengths are disposed in the corner portions of the pairs of juxtaposed flanges;

for a frame constituting the framework of a seat back, the said corner portions are disposed at the side ends of the base of the frame;

in at least some of their flat lengths, the juxtaposed flanges are assembled together by spot welds;

the two half-shells constituting the frame include mutually facing reentrant zones whose bottoms are juxtaposed in pairs and are assembled together by spot welds; and the juxtaposed flanges of the two half-shells are delimited by scalloped profiles.

As for the method of manufacturing the rolled edges of the shells, i.e. shaping the initially flat pairs of juxtaposed flanges so that they become tubular, it is advantageous to perform two successive forming steps, the first step consisting in folding each of the two pairs of flanges through 90° at a distance from the base thereof that is not less than the desired diameter for the tube; and the second step being progressively rolling up the resulting 90° folded flat towards the shell.

As to apparatuses for implementing said methods, it is advantageous for them to comprise:

a first matrix assembly comprising a base suitable for receiving one of the two half-shells, a cover guided so as to overlie the other half-shell when placed on the first halfshell, and a matrix suitable for receiving the base and cover assembly in such a manner that pressing down said assembly in said matrix has the effect of simultaneously folding each of said two pairs of juxtapozed flanges through 90° upwards along a fold line that is disposed at a distance from the roots of said flanges that is not less than the diameter of the tube to be formed; and a second forming assembly comprising a base suitable for receiving the base of the shell being manufactured with the marginal folded flats of its pairs of flanged pointing vertically upwards, and a cover disposed and guided in such a manner as to overlie said shell, the cover having curved areas shaped so as to roll up said folded flats progressively towards the shell.

In addition to the above main dispositions, the invention includes certain other dispositions which are preferably used simultaneously therewith and which are explained in greater detail below.

A preferred embodiment of the invention is described below with reference to the accompanying drawings, and naturally in non-limiting manner.

FIGS. 1 and 2 of the drawings are respectively a front view and a vertical midsection view on II—II in FIG. 1 of the framework of a vehicle seat back made in accordance with the invention.

Figure 3:
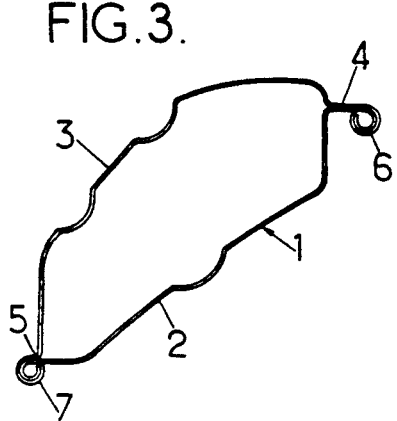
FIG. 3 is a section on a larger scale than FIG. 1 on line III—III of FIG. 1.

In conventional manner, the framework considered herein for supporting a back cushion of a vehicle seat is in the general shape of a frame or of a bottomless dish 1 tonning an annular shell, and is made up of two half-shells 2 and 3 of stamped sheet metal (preferably aluminum or aluminum alloy) which are juxtaposed along their flanges 4 and 5 that are respectively folded outwards (outer flange 4) and inwards (inner flange 5).

Compared with the framework made of welded plates or tubes, this shell type framework has the advantage of being very strong for given weight of material, and it makes it very easy to adapt local strength as a function of requirements, in particular by locally increasing or reducing at least some of the dimensions of the right cross-section of the shell.

However, the juxtaposed flanges of the two half-shells generally form sharp edges that are liable firstly to injure the personnel concerned with handling the framework and padding it, and indeed the occupants of the corresponding vehicle fitted with the finished seat, and secondly to cut and tear locally the seat padding that covers them.

In addition, the mutual assembly of the flanges performed between two juxtaposed surfaces that are plane or substantially plane is often not very reliable.

According to the invention, these drawbacks are remedied by rolling up the juxtaposed flanges in question, at least locally, thereby transforming them into inner and outer lengths of tube 6 and 7 of closed circular section.

This rolling-up operation is performed after the two plane or substantially plane flanges 4 and 5 have been juxtaposed, and it also serves to assemble these two flanges together.

The framework obtained in this way, i.e. having rolled-up or tubular edges 6, 7, obtained in this way presents numerous advantages, and in particular the following:

because of their rounded external profile, the rolled up edges in question are not sharp, thereby avoiding any danger of injury and considerably facilitating handling and subsequent operations (padding, mounting), while also avoiding any danger of tearing the covering that is placed on the framework;

the resulting mutual assembly of two half-shells along their rolled up edges is very strong and is very simple to perform automatically, as explained below; and the resulting rolled-up edges themselves increase the overall stiffness of the framework.

Figure 4:
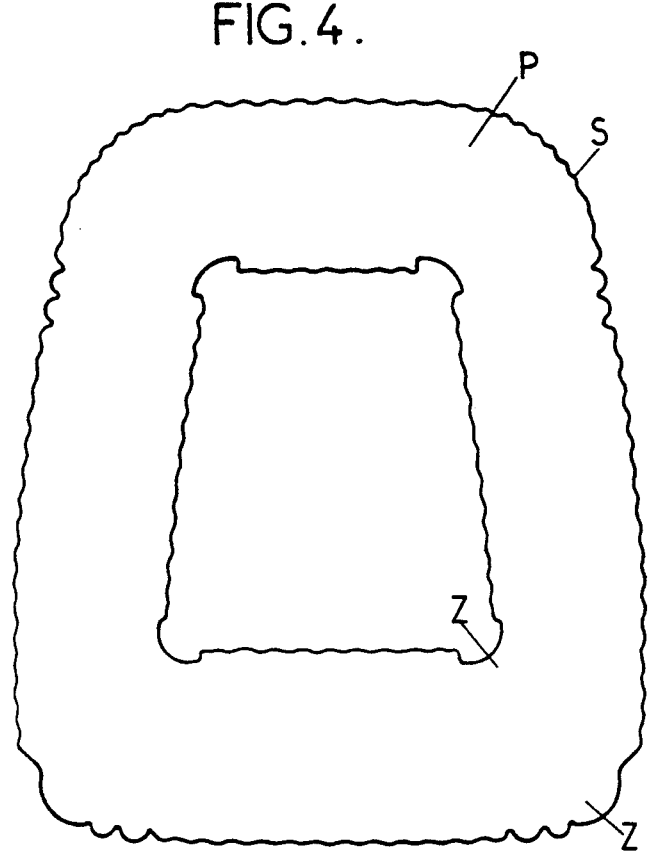
FIG. 4 shows one of the sheet metal plates constituting said framework prior to being shaped.

To facilitate the operation of rolling up the edges and to avoid forming local folds or warping (which may occur because the juxtaposed flanges to be rolled up are not rectilinear), it is advantageous to give a scalloped or notched shape to the outlines of the flanges as referenced by the letter S in FIG. 4, which shows the outline of the cutout ring shape prior to being formed of plate P for constituting one of the two half-shells 2 and 3. By taking this precaution, the volumes of metal that could give rise to excess thicknesses within the flanges when they are rolled up merely fill up some of the gaps or hollows left between the teeth or other projections in the scalloped profiles shown.

Also for simplifying the rolling-up operation, it is advantageous to interrupt this operation in the substantially right-angled corner zones Z at the bottom of the framework, there being four such zones, i.e. two inside corners and two outside corners of said framework.

To reinforce the framework, it is advantageous to provide additional spot welds 8 in the juxtaposed lengths of flange that remain merely juxtaposed in the corner zones Z without being rolled up.

For the same purpose of reinforcement, it is advantageous to provide mutually facing reentrant zones R in the two half-shells having bottoms that make contact with each other, with said bottoms being welded together by spot welds 9.

To roll up the inside and outside juxtaposed flanges 4 and 5, it is advantageous to proceed as follows:

initially both of the flanges in each juxtaposed pair are folded simultaneously through 90° along a fold line that is disposed at a sufficient distance from the shell to enable the flanges subsequently to be rolled up going towards the shell; and thereafter, the pairs of flats folded up in this way through 90° are progressively rolled up towards the shell by upsetting said pairs of flats progressively towards the shell by means of tools having reentrant curved working surfaces that initially engage the edges T of said flats (or at least the edge of the flange that is furthest from the shell, which is arranged to project slightly for this purpose and which then surrounds the other edge), with said tools being guided in displacement parallel to the folded-up flats in question.

Figure 5:
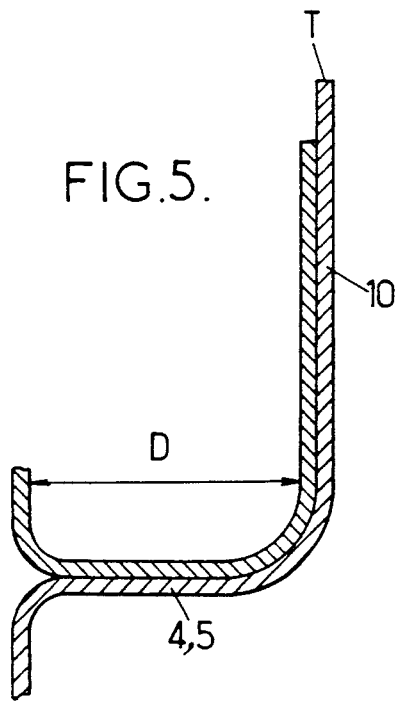
FIGS. 5 and 6 are sections on a much larger scale showing the shapes taken up by the juxtaposed flanges of the framework respectively after the first folding step and at the end of being rolled up.

FIG. 5 shows a pair of flats 10 folded in this way through 9.0° and forming a margin on a pair of juxtaposed flanges 4 and 5.

Figure 6:
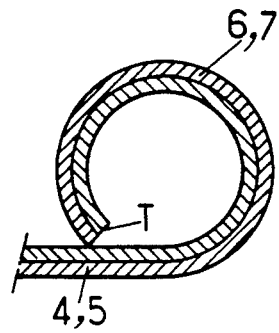

FIG. 6 shows a rolled-up edge 6, 7 obtained by rolling up such a flat 10.

Figure 7:
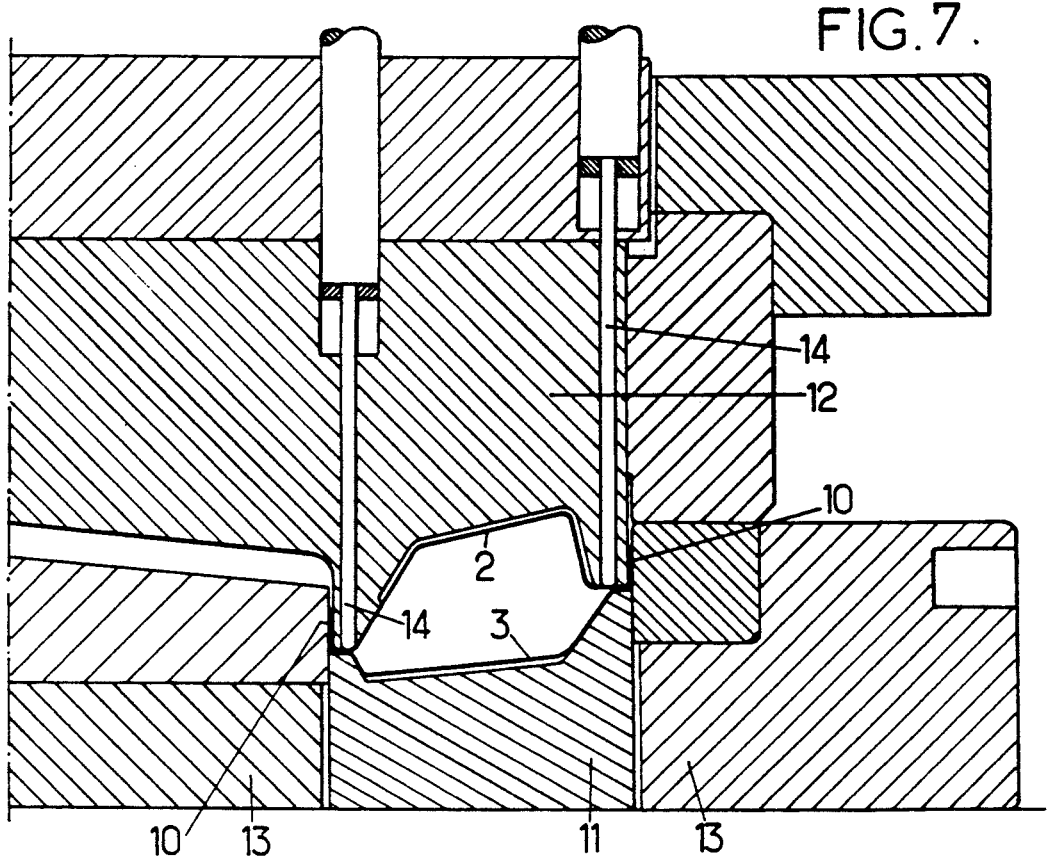
FIGS. 7 and 8 are respective fragmentary vertical section views through machines respectively for folding and for rolling up the juxtaposed flanges of the above framework in accordance with the invention.
Figure 8:
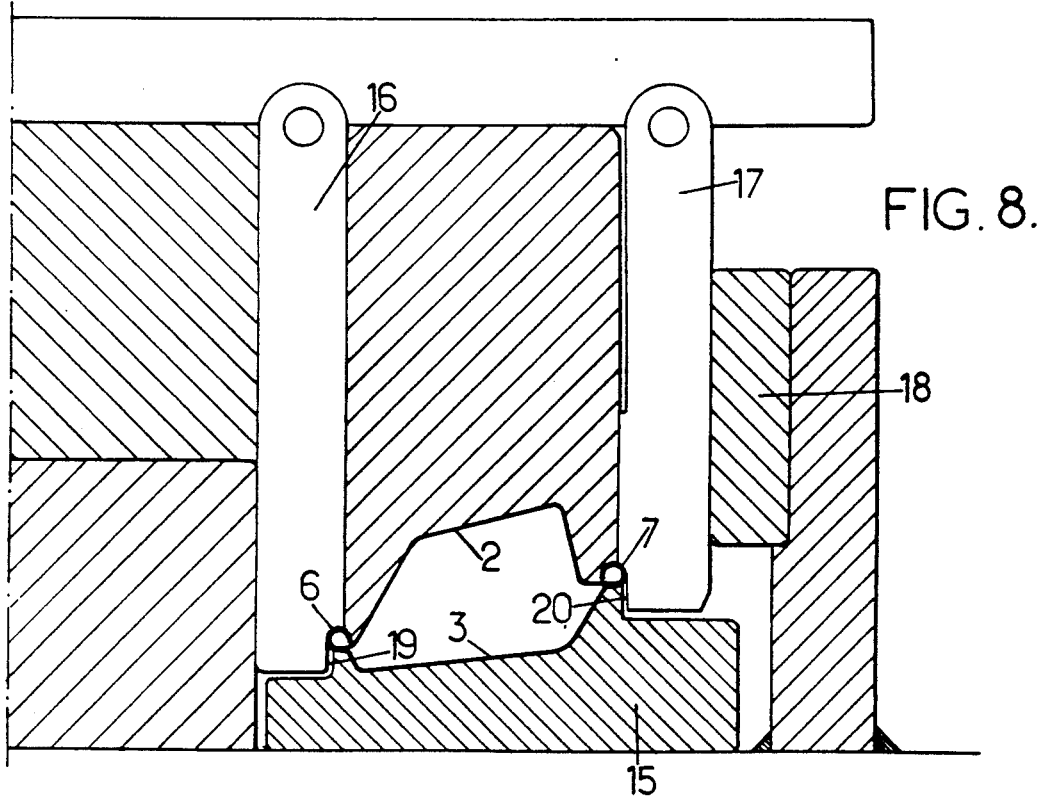

FIGS. 7 and 8 show respectively a folding machine for obtaining the pairs of flats 10 folded through 90°, and a rolling up machine for obtaining the rolled-up edges from said pairs of flats 10.

The first machine comprises a base 11 (FIG. 7) shaped to receive one of the two half-shells 2 and 3 (the half-shell 3) while covered with the other half-shell so that their respective inner and outer flanges 4 and 5 overlie each other, which flanges are initially plane and horizontal.

This machine also includes a cover or punch 12 suitable for simultaneously covering the other half-shell 3 and for lowering the entire assembly inside a matrix 13.

As can clearly be seen in FIG. 7, the cavity in the matrix 13 into which the vertically movable assembly is inserted has vertical walls suitable for running around both the inside and the outside of the two half-shells 2 and 3 at a distance from the cover 12 which is substantially equal to the thickness of the juxtaposed rims to be folded up.

The desired folding is then obtained merely by lowering the cover in the manner specified.

Push rods 14 bear against the tops of the non-folded portions of the juxtaposed flanges, thereby enabling the lid 12 to be removed while leaving the half-shell 2 on the half-shell 3.

The machine of FIG. 8 comprises a base 15 which this time is fixed and suitable for supporting a shell while it is being formed, i.e. an assembly comprising both half-shells 2 and 3 fitted one within the other along of their flats 10 that are folded vertically upwards.

This machine also includes cams 16 and 17 mounted to move vertically in respective guides 18 and suitable for coming into contact over the top edges of the folded-up flats 10 and then pushing them horizontally towards the shell.

The right cross-section of the profile 19, 20 of each cam has a vertical rectilinear portion extended upwardly by a 90° circular arc whose radius is equal to the radius to be formed on the rolled-up edge 6 or 7.

The two cams 16 and 17 are disposed so that they engage the edges of the flats 10 to be deformed simultaneously, thereby simultaneously rolling up both sets of flats, i.e. forming both rolled-up pairs of flanges 6 and 7.

The right cross-section of the rolled-up flanges is circular, and the radius of the corresponding circle generally lies in the range 2 mm to 8 mm, and is in particular about 3.5 mm for sheet metal having a thickness of 0.5 mm.

The rolled-up portions of the pairs of tubular or rolled-up flanges 6 and 7 extend over an arc that is large enough to ensure that the corresponding lengths of tube are "closed" laterally, i.e. so that the edges T of said flanges come at least into contact with the facing areas of the non-deformed roots of said flanges, as can be seen in FIG. 6.

Said arc then extends over about 315°.

However, the arc could be considerably greater, and in particular rolling up could take place over more than one complete turn, e.g. occupying a turn and a half or two turns for the purposes of stiffening and consolidating the assembly.

From which it follows, regardless of the particular embodiment adopted, the final product is a framework in the form of a shell having rolled-up edges whose structure, manufacture, and advantages can be seen sufficiently clearly from the above.

Naturally, and as can be seen from the above description, the invention is not limited in any way to the applications and embodiments thereof that are described in detail. On the contrary, the invention extends to any variant, and in particular to variants where at least one of the two inner and outer rolled-up pairs of flanges of the shell framework extend over the entire corresponding inner or outer outline instead of being interrupted by flat portions, i.e. non-rolled-up portions, as described above.

I claim:

1. A rigid frame serving as a framework for a car seat component, the frame being constituted by a shell itself being made up by assembling together two half-shells (2, 3) of stamped sheet metal along their juxtaposed edge flanges (4, 5) which extend respectively along an inside perimeter and an outside perimeter of each of the half-shells, the frame being characterized in that the juxtaposed flanges of the half-shells are rolled up into tubes of closed circular section (6, 7), at least over the major portion of their length.

2. A frame according to claim 1, characterized in that at least one of the inside and outside juxtaposed edge flanges is constituted by a plurality of tubular lengths (6, 7) are separated from one another by flat portions that are short in length.

3. A frame according to claim 2, characterized in that the flat portions are disposed in corner portions (Z) of the one of the juxtaposed flanges.

4. A frame according to claim 3, constituting the framework of a seat back, and characterized in that said corner portions (Z) are disposed at side ends of a base of the frame.

5. A frame according to claim 2, characterized in that in at least some of the flat portions, the juxtaposed flanges are assembled together by spot welds (8).

6. A frame according to claim 1, characterized in that the two half-shells (2, 3) constituting the frame include mutually facing reentrant zones (R) whose bottoms are juxtaposed in pairs and are assembled together by spot welds (9).

7. A frame according to claim 1, characterized in that the juxtaposed flanges (4, 5) of the two half-shells (1, 2) are delimited by scalloped profiles (S).

* * * * *